(12) United States Patent
Visenzi

(10) Patent No.: US 8,152,036 B2
(45) Date of Patent: Apr. 10, 2012

(54) CASE ASSEMBLY FOR MOTORCYCLE INCLUDING A COUPLING SYSTEM

(75) Inventor: Giuseppe Visenzi, Brescia (IT)

(73) Assignee: GI. VI. S.R.L. (IT)

( * ) Notice: Subject to any disclaimer, the term of this patent is extended or adjusted under 35 U.S.C. 154(b) by 971 days.

(21) Appl. No.: 12/083,841

(22) PCT Filed: Oct. 9, 2006

(86) PCT No.: PCT/EP2006/009735
§ 371 (c)(1),
(2), (4) Date: Jun. 13, 2008

(87) PCT Pub. No.: WO2007/045371
PCT Pub. Date: Apr. 26, 2007

(65) Prior Publication Data
US 2010/0181356 A1 Jul. 22, 2010

(30) Foreign Application Priority Data

Oct. 18, 2005 (IT) .......................... MI2005A01973

(51) Int. Cl.
*B62J 9/00* (2006.01)
(52) U.S. Cl. ........ 224/413; 224/419; 224/421; 224/426; 224/431; 224/433; 224/448; 224/449
(58) Field of Classification Search .............. 224/413, 224/419, 420, 421, 425, 426, 431, 433, 437, 224/447–449, 456, 458, 558; 280/288.4; 296/37.1
See application file for complete search history.

(56) References Cited

U.S. PATENT DOCUMENTS

| | | | | |
|---|---|---|---|---|
| 4,671,438 A * | 6/1987 | La Plante | ...................... | 224/438 |
| 5,673,833 A * | 10/1997 | Ortlieb | ........................ | 224/425 |
| 5,810,230 A | 9/1998 | Nutto | | |
| 6,095,473 A | 8/2000 | Engers | | |
| 6,354,476 B1 * | 3/2002 | Alderman | ...................... | 224/413 |
| 6,631,835 B2 * | 10/2003 | Fang | .............................. | 224/413 |
| 2001/0030215 A1 * | 10/2001 | Vincenzo | ...................... | 224/435 |
| 2003/0147691 A1 | 8/2003 | Ho | | |
| 2004/0149792 A1 | 8/2004 | Akita et al. | | |

FOREIGN PATENT DOCUMENTS

| | | |
|---|---|---|
| EP | 1 065 139 | 1/2001 |
| WO | WO 01/02238 | 1/2001 |
| WO | WO 01/12496 | 2/2001 |

* cited by examiner

*Primary Examiner* — Gary Elkins
(74) *Attorney, Agent, or Firm* — Gerald E. Hespos; Michael J. Porco

(57) ABSTRACT

A case assembly for motorcycles comprises a frame (11) for coupling to the motorcycle and a case (12) including means that allow its removable coupling to the frame. The means which allow the removable coupling include U-shaped elements (17) which move between a non-active position to accommodate therein a complementary element (13) of the frame and an active rotated position to secure therein said element (13) of the frame. Conveniently, between the case and the frame there are other passive coupling means (14, 15) at a distance of the U-shaped elements for positioning the case before the coupling movement of the U-shaped elements.

18 Claims, 5 Drawing Sheets

CASE ASSEMBLY FOR MOTORCYCLE INCLUDING A COUPLING SYSTEM

BACKGROUND OF THE INVENTION

1. Field of the Invention. This invention relates to a case assembly for motorcycle including an innovative coupling system.

2. Description of the Related Art. In the field of equipments for motorcycles there is the common known problem to provide a stable and safe coupling system for removable side cases. Usually the case assembly includes a specific frame which is fixed irremovably to the motorcycle and a case including suitable coupling means for the removable coupling to the frame. Various types of coupling means have been proposed in the prior art in the attempt to supply a secure coupling of the case avoiding accidental disengagements or false couplings and at the same time to allow the user to easily intentionally engage and disengage the case.

The general object of this invention is to supply a case assembly for motorcycles with safety and stability features greatly improved in comparison to known systems, retaining at the same time operational easiness and a simple but strong structure.

SUMMARY OF THE INVENTION

A case assembly for motorcycles according to the invention comprises a frame for coupling to the motorcycle and a case including means that allow its removable coupling to the frame, the characterizing feature of the assembly is that the coupling means include U-shaped elements which move between a non-active position to accommodate therein a complementary element of the frame and an active rotated position to secure therein said element of the frame.

BRIEF DESCRIPTION OF THE DRAWINGS

In order to further explain the innovative principles of this invention and its advantages in comparison to the prior art, an embodiment of the invention is described hereinafter by reference to the enclosed drawings. Therein.

DETAILED DESCRIPTION OF THE PREFERRED EMBODIMENT

Figure 1:
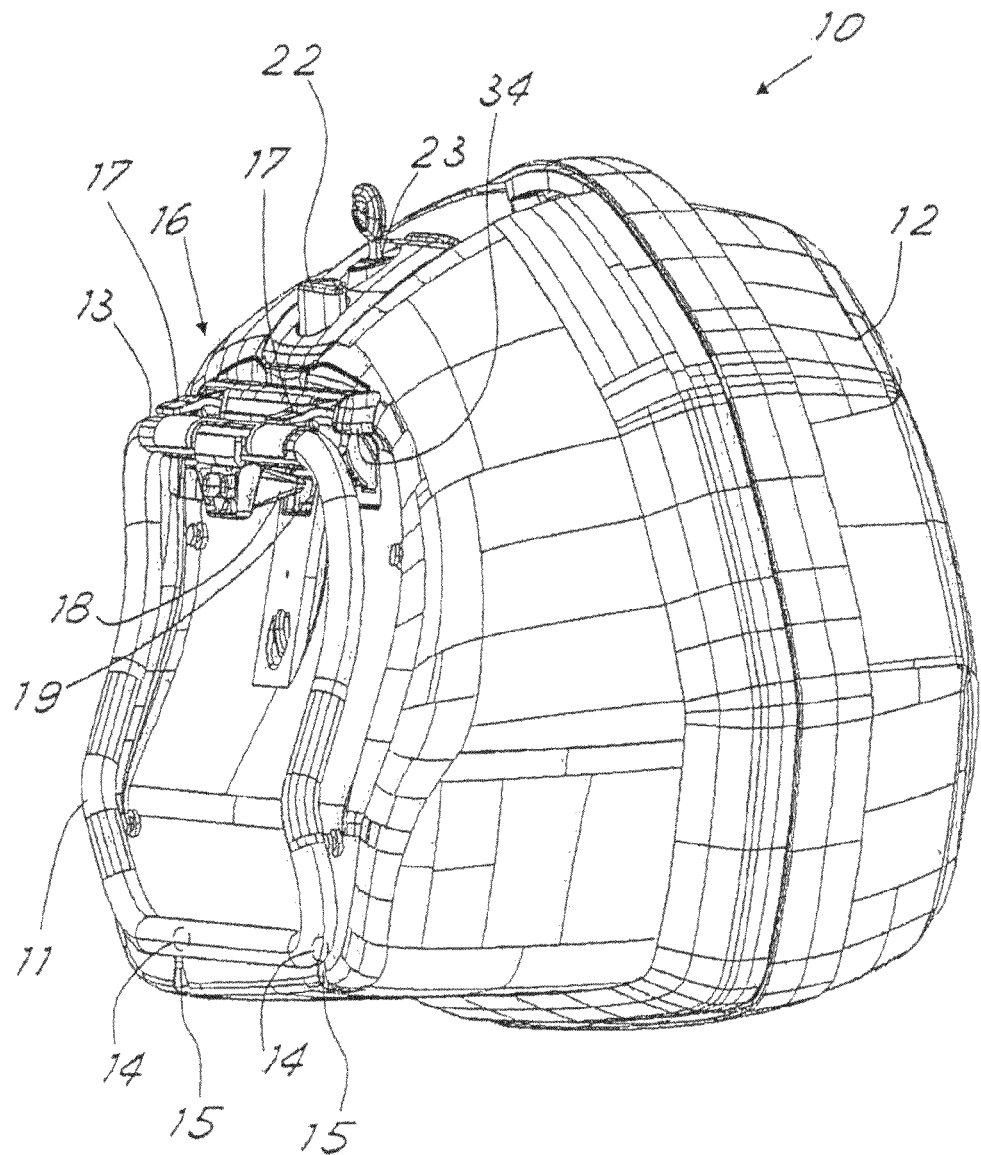
FIG. 1 shows a schematic and prospective view of the case assembly according to the invention.

Referring to the figures, in FIG. 1 a case assembly according to the invention, generally indicated as 10, is depicted.

Such case assembly 10 comprises a frame 11 which has to be fixed to a motorcycle by known means, not shown herein, and a rigid case 12. Between the frame 11 and the case assembly 10 there are suitable means for the removable coupling. The case 12 has a shape and features which are already known, thus, it will not be described in detail herein.

Conveniently, the frame 11 is a tubular frame adequately shaped to obtain lateral support points for the case 12 and an upper hooking bar 13. The case 12 has a side to be coupled with the frame 11 on which there are coupling means. The coupling means include a pair of passive coupling means 14 conveniently having mushroom shape (better visible in FIG. 2), to be coupled with adequate hollows 15 made near the lower edge of the case 12. The hollows 15 are open at the bottom in order to allow the insertion of the mushroom shaped coupling means 14 by moving the case 12 downwards.

Near the upper edge, the case 12 has an active coupling mean 16 including a pair of movable U-shaped elements 17 aligned to form a tube to accommodate the horizontal hooking bar 13 of the frame 11.

The U-shaped elements 17 can be rotated on demand (conveniently along a common axis 20 parallel to the hooking bar 13) to move between a disengaged non-active position and an active position of fix engagement onto the horizontal hooking bar 13 of the frame 11.

Figure 2:
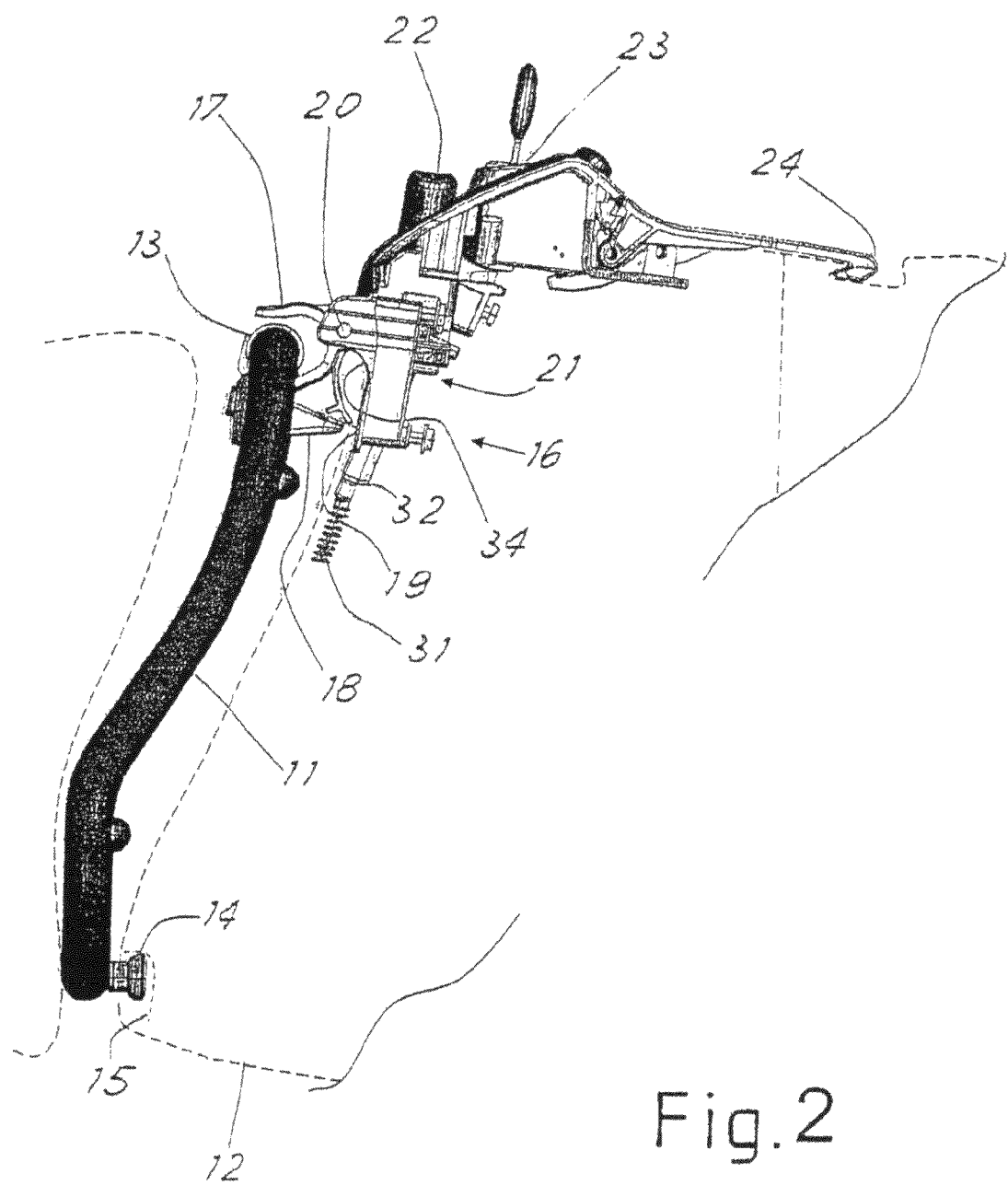
FIG. 2 shows a lateral, schematic and partial view of the coupling system of the case assembly according to FIG. 1, in a position of partial engagement.

In the disengaged position, shown in FIGS. 1 and 2, the U-shaped elements 17 look outward from the back side of the case 12, in particular, they are aligned horizontal having the opening looking outward, so that the hooking bar 13 can freely enter or exit the tube formed by the two aligned U-shaped elements. In the engaged position shown in FIG. 3, the U-shaped elements 17 are parallel to the back side of the case 12, in particular they look downward so that they prevent the case 12 to move away from the frame 11.

Conveniently, the case 12 has also a resting groove 34 above the hooking bar 13 when the U-shaped elements 17 are in the active position, so that the weight of the case 12 is partially relieved from the U-shaped elements 17.

The pivoting of the U-shaped elements 17 is in an upper position relative to the horizontal hooking bar 13 in such a manner, that the thrust of the hooking bar 13 inside the U-shaped elements 17 makes them automatically rotate into the engaged position.

There are also blocking means in order to prevent the case 12 to slide upward when being engaged onto the frame 11. Conveniently, these blocking means comprise a central tooth 18 protruding from the frame 11 and inserting into a specific seat 19 in the wall of the case 12 when the case 12 is in the engaged position of FIG. 3.

Figure 6:
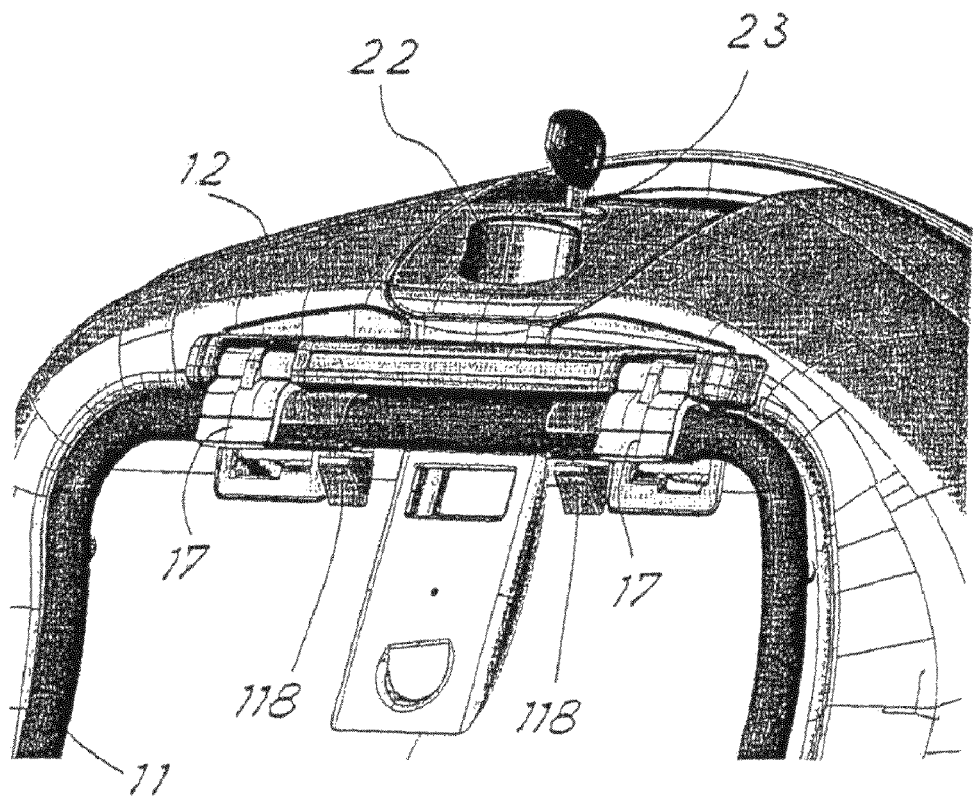
FIG. 6 shows an embodiment of the coupling system according to the invention.

In FIG. 6 an alternative embodiment is shown in which the central tooth 18 is replaced by a pair of rigid protuberances 118 which projects from the wall of the case 12 in order to be placed immediately beneath the horizontal hooking bar 13 of the frame 11 in such a manner, that the engaged case 12 cannot move upward.

Figure 3:
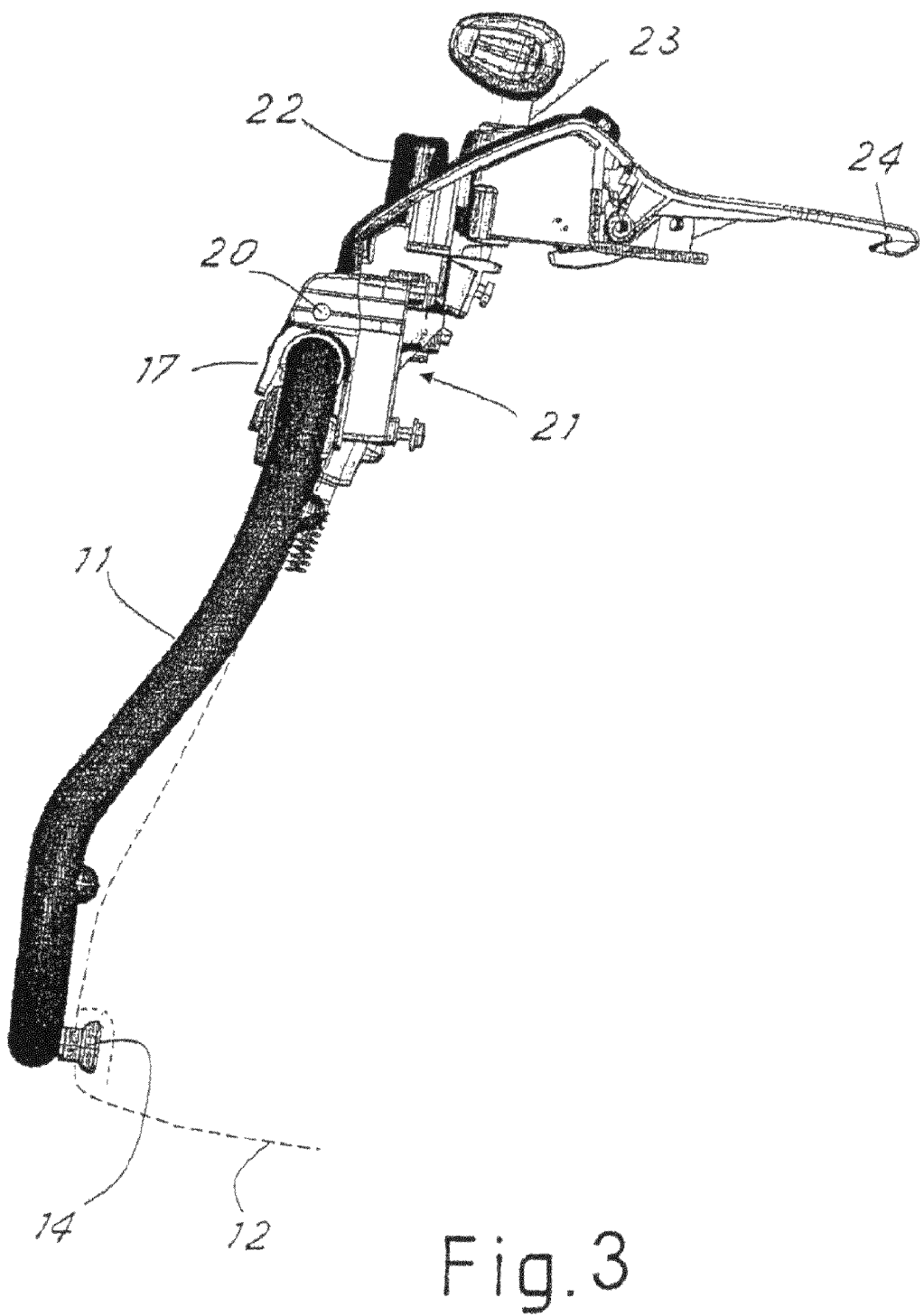
FIG. 3 shows a view similar to the one of FIG. 2 but in a position of full engagement.

Hence, as it will be clear, the movement from the non-active position of FIG. 2 to the engaged active position of FIG. 3 is obtained by means of a spring simply pushing the case 12 against the frame 11 after having inserted the lower mushrooms shaped coupling means 14 into their seats in the case 12. Once in the active position, the U-shaped elements 17 are steadily kept in such position by a block mechanism 21 which can be released through a push button 22. Conveniently, further, a lock 23 can be added to prevent the possibility of disengagement of the case 12. Further conveniently, the lock 23 can also at the same time block the locking mechanism of the case 12, for example realized by a hook 24 which engages a complementary rim in the covershell of the case 12.

Figure 4:
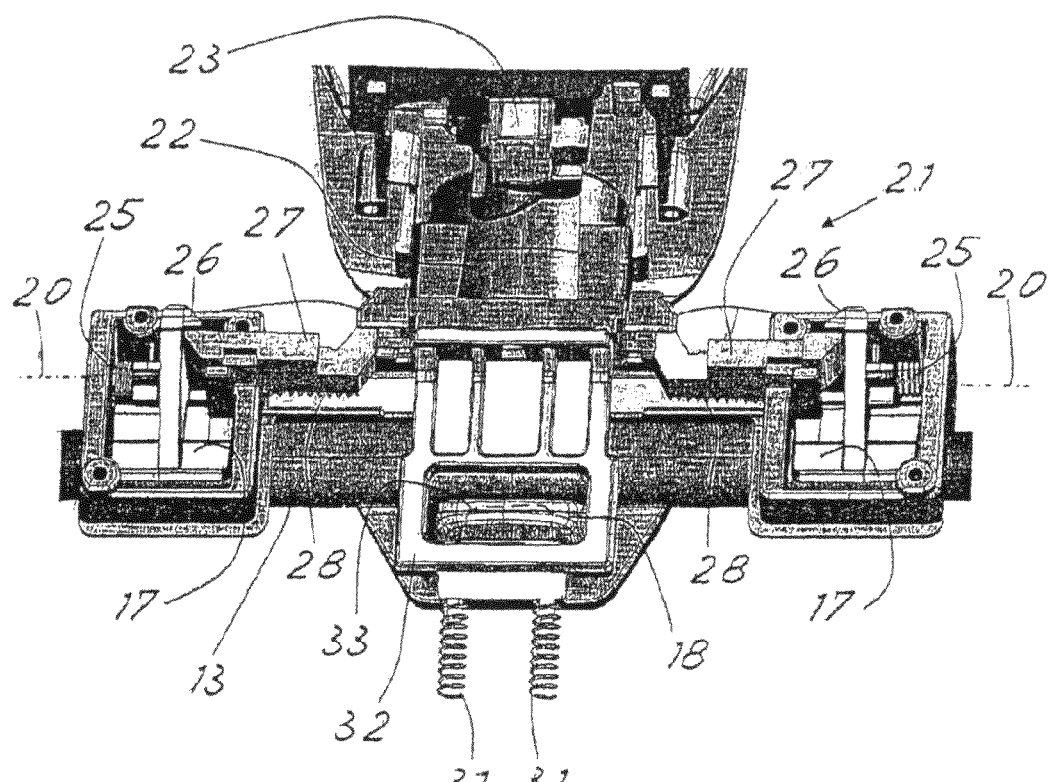
FIG. 4 shows an enlarged partial view of the coupling mechanism of the case assembly according to FIG. 1.

In FIG. 4 the detail of the block mechanism 21 is shown from the back, after removing the covershell of the case 12 (the mechanism is in engaged position, with the U-shaped elements 17 facing downward). As it can be seen in this FIG., each U-shaped element 17 has a spring 25 required to push it in the non-active horizontal position, and a tooth 26 on the back which inserts in the end of a sliding element 27 when the U-shaped element 17 is in active position. The two sliding elements 27 are pushed toward the engagement position respectively by two springs 28. In this way, when the U-shaped element 17 is pushed in the active position by the action of its spring 25, the sliding element 27 clicks into the engagement position under the tooth 26, blocking the U-shaped element 17 into the active position.

The push button 22 operates on the sliding elements 27 in such a way that, when it is pushed, it retreats the sliding elements 27 from the engagement position with the U-shaped elements 17 releasing back into the non-active position.

Figure 5:
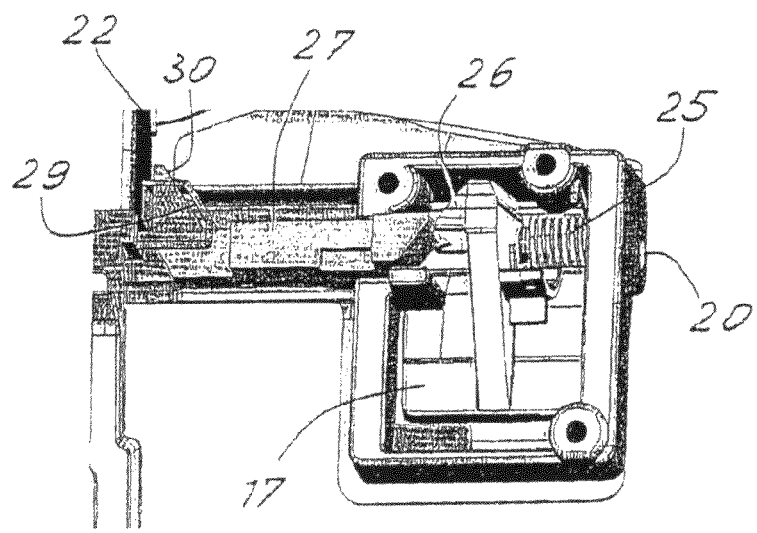
FIG. 5 shows a further detail of the coupling means according to the invention.

As it can be easily seen in the enlarged detail of FIG. 5, the push button 22 operates on each sliding element 27 by an inclined plane 29 which slides on a corresponding inclined plane 30 of the sliding element 27. The lock 23 can operate in a known way to prevent the operation of the push button 22.

As it can be seen in FIG. 4, the push button 22 operates also, by the action of springs 31, a bolt 32 which has a protuberance 33 inserting into a seat in the tooth 18. In this way, a further protection against the disengagement of the case 12 is provided.

At this point it is clear how the objects of the invention have been reached. Having the frame 11 mounted on the motorcycle, it is sufficient to insert the lower hollows 15 in the protruding mushrooms shaped coupling means 14, which are a position reference, and to push the case 12 from the top against the frame 11 in order to engage the central tooth 18 in the corresponding seat and cause the rotation toward the block or lock position of the U- shaped elements 17 in order to engage the case 12. In this manner, the case 12 is fixed in at least four points. The case 12 can be disengaged with only one movement by pressing the push button 22 with the lock unlocked.

Moreover, the free movement of the U-shaped elements 17 toward the operating position allows engaging the case 12 to the frame 11 even when the lock is already in the block position.

The system according to the invention grants high security, stable and reliable engagement, no vibrations and operational easiness.

As a matter off course, the description mentioned above refers to one embodiment of the innovative principles of this invention and is an exemplification of such innovative principles only, and does not have to be considered limitative for the scope of the invention hereby claimed. For example, the means which prevent the case 12 to move upward can be different from the tooth 18. For example, they may include a tooth protruding from the case 12 to insert into the frame 11.

In the embodiment described, the whole mechanism including the movable elements is close to the upper edge of the case 12, this allows to easily realize a functional assembly including all the movable elements, the handle, the lock, and the push button. The frame 11 can also be different from the tubular frame described.

The invention claimed is:

1. Case assembly for motorcycles comprising a frame (11) for coupling to the motorcycle and a case (12) including means for allowing removable coupling of the case (12) to the frame (11), the means for allowing the removable coupling including U-shaped elements (17) that move between a non-active position to accommodate therein a complementary element (13) of the frame (11) and an active rotated position to secure therein said element (13) of the frame (11), passive coupling means between the case (12) and the frame (11) and distanced from the U-shaped elements (17), the U-shaped elements (17) being near an upper edge of a coupling wall of the case (12) and the passive coupling means (14, 15) being near a lower edge of the coupling wall of the case (12), and the movement of the U-shaped elements (17) from the non-active to the active position being caused by pushing the case (12) downward against the frame (11) after having inserted the passive coupling means (14, 15).

2. Case assembly according to claim 1, wherein the U-shaped elements (17) are parallel to the coupling wall of the case (12) in the active position.

3. Case assembly according to claim 2, wherein the U-shaped elements (17) have an open part facing downward in the active position.

4. Case assembly according to claim 1, wherein the complementary element (13) of the frame (11) is part of a horizontal bar (13) of the frame (11).

5. Case assembly according to claim 4, wherein the U-shaped elements (17) are two elements which are distanced from one another along the horizontal bar (13).

6. Case assembly according to claim 4, wherein the case (12) has a resting groove (34) for said horizontal bar (13) along which are inserted the U-shaped elements (17).

7. Case assembly according to claim 1, wherein between the case (12) and the frame (11) there are means (18, 19) for preventing vertical movement when the case (12) is engaged onto the frame (11).

8. Case assembly according to claim 1, wherein the case (12) has a mechanism (21) which blocks the U-shaped elements (17) into the active position when they are moved from the non-active to the active position.

9. Case assembly according to claim 8, wherein the mechanism (21) comprises a push button (22) used to disengage the U-shaped elements (17) and allowing them to return, pushed by a spring, into the non-active position.

10. Case assembly according to claim 9, wherein the case (12) has a lock (23) that prevents movement of the push button (22).

11. Case assembly according to claim 10, wherein the lock (23) is kinematically connected to a case opening mechanism (24) to prevent operation of the case opening mechanism (24) on demand.

12. Case assembly for motorcycles comprising a frame (11) for coupling to the motorcycle and a case (12) including means for allowing removable coupling of the case (12) to the frame (11), the means for allowing the removable coupling including U-shaped elements (17) that move between a non-active position to accommodate therein a complementary element (13) of the frame (11) and an active rotated position to secure therein said element (13) of the frame (11), and passive coupling means between the case (12) and the frame (11) and distanced from the U-shaped elements (17), wherein the passive coupling means (14, 15) comprise mushroom shaped elements (14) protruding from the frame (11) which insert, by vertical movement of the case (12), into specific grooves (15) in the case (12).

13. Case assembly for motorcycles comprising a frame (11) for coupling to the motorcycle and a case (12) including means for allowing removable coupling of the case (12) to the frame (11), the means for allowing the removable coupling including U-shaped elements (17) that move between a non-active position to accommodate therein a complementary element (13) of the frame (11) and an active rotated position to secure therein said element (13) of the frame (11), and a tooth (18) protruding from the frame (11), the tooth (18) being insertable into a specific seat (19) in a wall of the case (12) to prevent vertical movement of the case (12).

14. Case assembly according to claim 13, further comprising passive coupling means (14, 15) between the case (12) and the frame (11) and distanced from the U-shaped elements (17).

15. Case assembly according to claim 14, wherein the U-shaped elements (17) are near an upper edge of the wall of the case (12) and the passive coupling means (14, 15) are near a lower edge of the wall of the case (12), and the movement of the U-shaped elements (17) from the non-active to the active position is caused by pushing the case (12) downward against the frame (11) after having inserted the passive coupling means (14, 15).

16. Case assembly according to claim 13, wherein the case (12) has a bolt (32) that is used to insert the tooth (18) and to prevent the tooth (18) from leaving the seat.

17. Case assembly according to claim 16, wherein the bolt (32) is kinematically connected to a push button (22) to release the tooth (18) when the push button is pressed.

18. Case assembly, for motorcycles comprising a frame (11) for coupling to the motorcycle and a case (12) including means for allowing removable coupling of the case (12) to the frame (11), the means for allowing the removable coupling including U-shaped elements (17) that move between a non-active position to accommodate therein a complementary element (13) of the frame (11) and an active rotated position to secure therein said element (13) of the frame (11), and protuberances (118) projecting from the case wall, the protuberances (118) being insertable beneath a horizontal element of the frame (11) when the case (12) is engaged onto the frame (11) to prevent vertical movement of the case (12).

* * * * *